(12) United States Patent
Witz (10) Patent No.: US 8,770,234 B2
(45) Date of Patent: Jul. 8, 2014

(54) HOSE

(75) Inventor: Joel Aron Witz, Newdigate (GB)

(73) Assignee: BHP Billiton Petroleum Pty. Limited, Melbourne, VIC (AU)

( * ) Notice: Subject to any disclaimer, the term of this patent is extended or adjusted under 35 U.S.C. 154(b) by 1062 days.

(21) Appl. No.: 12/677,854

(22) PCT Filed: Sep. 15, 2008

(86) PCT No.: PCT/GB2008/003135
§ 371 (c)(1),
(2), (4) Date: Jun. 10, 2010

(87) PCT Pub. No.: WO2009/034364
PCT Pub. Date: Mar. 19, 2009

(65) Prior Publication Data
US 2010/0300570 A1     Dec. 2, 2010

(30) Foreign Application Priority Data

Sep. 14, 2007 (GB) .................................. 0718018.5
Sep. 14, 2007 (GB) .................................. 0718019.3
Sep. 14, 2007 (GB) .................................. 0718020.1

(51) Int. Cl.
*F16L 11/00*     (2006.01)

(52) U.S. Cl.
USPC ............ 138/138; 138/125; 138/143; 138/133

(58) Field of Classification Search
USPC ................................. 138/138, 125, 143, 133
See application file for complete search history.

(56) References Cited

U.S. PATENT DOCUMENTS

| | | |
|---|---|---|
| 956,076 A | 4/1910 | Greenfield |
| 1,178,559 A | 4/1916 | Vautier |
| 1,588,606 A | 6/1926 | Oden |
| 1,599,775 A | 9/1926 | Lamb et al. |
| 1,607,909 A | 11/1926 | Oden |
| 1,785,345 A | 12/1930 | Hasemann |
| 1,810,032 A | 6/1931 | Schulthess |
| 1,901,330 A | 3/1933 | Poberejsky |
| 1,911,486 A | 5/1933 | Bacheldor et al. |
| 2,011,781 A | 8/1935 | Tabozzi |
| 2,184,984 A | 12/1939 | Van Stone et al. |
| 2,371,363 A | 3/1945 | Smith |
| 2,610,869 A | 9/1952 | Percy |

(Continued)

FOREIGN PATENT DOCUMENTS

| | | |
|---|---|---|
| CN | 1441884 | 9/2003 |
| CN | 1732352 | 2/2006 |

(Continued)

OTHER PUBLICATIONS

Patent Application entitled, "Improvements Relating to Pipe", by Joel Aron Witz filed on Mar. 12, 2010 as U.S. Appl. No. 12/677,852.

(Continued)

*Primary Examiner* — Patrick F Brinson
(74) *Attorney, Agent, or Firm* — Brinks Gilson & Lione; G. Peter Nichols (57) ABSTRACT

A hose comprising a tubular body of flexible material arranged between inner and outer gripping members, wherein at least one of the gripping members is made of a material, especially a composite material, which expands on cooling.

11 Claims, 1 Drawing Sheet

(56) References Cited

U.S. PATENT DOCUMENTS

| | | |
|---|---|---|
| 2,661,026 A | 12/1953 | Schulthess |
| 2,706,494 A | 4/1955 | Morse |
| 2,825,364 A | 3/1958 | Cullen et al. |
| 2,829,671 A | 4/1958 | Ernst et al. |
| 2,858,147 A | 10/1958 | Guarnaschelli |
| 2,940,778 A | 6/1960 | Kaiser |
| 3,004,779 A | 10/1961 | Cullen et al. |
| 3,140,106 A | 7/1964 | Thomas et al. |
| 3,189,370 A | 6/1965 | Marshail |
| 3,240,643 A | 3/1966 | Schroeder et al. |
| 3,287,194 A | 11/1966 | Waddell, Jr. |
| 3,318,620 A | 5/1967 | Cullen et al. |
| 3,333,325 A | 8/1967 | Stanley |
| 3,462,177 A | 8/1969 | Skinner et al. |
| 3,538,728 A | 11/1970 | Trihey |
| 3,603,719 A | 9/1971 | Lejeune |
| RE28,155 E | 9/1974 | Dow et al. |
| 3,856,052 A | 12/1974 | Feucht |
| 3,919,026 A | 11/1975 | Mizutani et al. |
| 4,033,612 A | 7/1977 | Chevalier |
| 4,063,757 A | 12/1977 | Fuhrmann |
| 4,323,089 A | 4/1982 | Kadono et al. |
| 4,330,143 A | 5/1982 | Reneau |
| 4,344,908 A | 8/1982 | Smith et al. |
| 4,351,366 A | 9/1982 | Angioletti |
| 4,377,186 A | 3/1983 | Genini et al. |
| 4,411,845 A | 10/1983 | Tanahashi |
| 4,422,993 A | 12/1983 | Smith et al. |
| 4,430,383 A | 2/1984 | Smith et al. |
| 4,436,689 A | 3/1984 | Smith et al. |
| 4,445,543 A | 5/1984 | Mead |
| 4,634,153 A | 1/1987 | Kishton |
| 4,826,354 A | 5/1989 | Adorian |
| 4,924,679 A | 5/1990 | Bringham |
| 4,950,001 A | 8/1990 | Briggs |
| 5,182,147 A | 1/1993 | Davis |
| 5,480,193 A | 1/1996 | Echols et al. |
| 5,485,870 A | 1/1996 | Kraik |
| 5,639,128 A | 6/1997 | Belcher |
| 5,647,563 A | 7/1997 | Gantner et al. |
| 5,685,576 A | 11/1997 | Wolfe et al. |
| 5,698,278 A | 12/1997 | Emond et al. |
| 5,860,682 A | 1/1999 | Belcher |
| 5,893,681 A | 4/1999 | Boden |
| 5,934,077 A * | 8/1999 | Martinis ............................ 62/3.1 |
| 5,952,067 A * | 9/1999 | Head ............................ 428/36.3 |
| 6,110,550 A | 8/2000 | Jarrin et al. |
| 6,334,466 B1 | 1/2002 | Jani et al. |
| 6,659,510 B1 | 12/2003 | Ikegami et al. |
| 6,874,542 B2 | 4/2005 | Mayau et al. |
| 6,923,477 B2 | 8/2005 | Buon et al. |
| 7,243,686 B2 | 7/2007 | Burke et al. |
| 7,712,792 B2 | 5/2010 | Burke et al. |
| 7,735,524 B2 | 6/2010 | Burke et al. |
| 7,743,792 B2 | 6/2010 | Burke et al. |
| 8,292,828 B2 * | 10/2012 | Uihlein ............................ 600/585 |
| 2003/0178085 A1 * | 9/2003 | Burke et al. ............................ 138/138 |
| 2004/0066035 A1 | 4/2004 | Buon et al. |
| 2004/0112454 A1 | 6/2004 | Takagi |
| 2004/0146676 A1 | 7/2004 | Ikemoto |
| 2004/0256016 A1 | 12/2004 | Arima et al. |
| 2005/0211082 A1 * | 9/2005 | Angeloni et al. ............................ 87/3 |
| 2006/0232064 A1 * | 10/2006 | Burke et al. ............................ 285/259 |
| 2006/0247079 A1 * | 11/2006 | Sutherland et al. ............ 473/567 |
| 2007/0024051 A1 | 2/2007 | Witz et al. |
| 2009/0320951 A1 | 12/2009 | Witz et al. |
| 2010/0059133 A1 | 3/2010 | Witz et al. |
| 2010/0180976 A1 | 7/2010 | Witz et al. |
| 2010/0183371 A1 | 7/2010 | Witz et al. |
| 2010/0224277 A1 | 9/2010 | Witz et al. |
| 2010/0229991 A1 | 9/2010 | Witz et al. |
| 2010/0229992 A1 | 9/2010 | Witz et al. |

FOREIGN PATENT DOCUMENTS

| | | |
|---|---|---|
| DE | 1 425 453 | 7/1969 |
| DE | 2 431 277 | 1/1975 |
| DE | 2 948 416 | 6/1981 |
| DE | 3 440 459 | 5/1986 |
| DE | 9 207 276 | 10/1992 |
| DE | 9 407 409 | 7/1994 |
| DE | 10 2005 046367 | 4/2006 |
| EP | 0 032 352 | 7/1981 |
| EP | 0 076 540 | 4/1983 |
| EP | 0 183 285 | 4/1986 |
| EP | 0 241 656 | 10/1987 |
| EP | 0 215 507 | 11/1989 |
| EP | 0 438 831 | 8/1995 |
| EP | 0 264 587 | 4/1998 |
| EP | 0 855 496 | 7/1998 |
| EP | 0 895 013 | 5/2000 |
| EP | 0 833 769 | 10/2001 |
| EP | 1 288 558 | 3/2003 |
| EP | 1 344 969 | 9/2003 |
| EP | 1 428 748 | 6/2004 |
| FR | 1499956 | 4/1966 |
| FR | 2194906 | 3/1974 |
| FR | 2235324 | 6/1974 |
| FR | 2753257 | 3/1998 |
| GB | 323352 | 1/1930 |
| GB | 550543 | 1/1943 |
| GB | 591307 | 8/1947 |
| GB | 591560 | 8/1947 |
| GB | 741643 | 12/1955 |
| GB | 849121 | 9/1960 |
| GB | 850131 | 9/1960 |
| GB | 895553 | 5/1962 |
| GB | 1019370 | 2/1966 |
| GB | 1034956 | 7/1966 |
| GB | 1312509 | 4/1973 |
| GB | 1383313 | 2/1974 |
| GB | 1477433 | 6/1977 |
| GB | 2070725 | 9/1981 |
| GB | 2104992 | 3/1983 |
| GB | 2104996 | 3/1983 |
| GB | 2107819 | 5/1983 |
| GB | 2186657 | 8/1987 |
| GB | 2223817 | 4/1990 |
| GB | 2289107 | 11/1995 |
| GB | 2303574 | 2/1997 |
| GB | 2312725 | 11/1997 |
| GB | 2339251 | 1/2000 |
| GB | 2363440 | 12/2001 |
| GB | 2366345 | 3/2002 |
| GB | 2408307 | 5/2005 |
| JP | 1283494 | 11/1989 |
| JP | 03-075132 | 3/1991 |
| JP | 08011138 | 1/1996 |
| JP | 08336845 | 12/1996 |
| JP | 11325333 | 11/1999 |
| SE | 200500810 A * | 10/2006 |
| SU | 396271 | 8/1973 |
| WO | WO 93/24731 | 12/1993 |
| WO | WO 96/36592 | 11/1996 |
| WO | WO 97/00805 | 1/1997 |
| WO | WO 01/96772 | 12/2001 |
| WO | WO 2004/044472 | 5/2004 |
| WO | WO 2004/079248 | 9/2004 |
| WO | WO 2005/119150 | 12/2005 |
| WO | WO 2006/044053 | 4/2006 |
| WO | WO 2007/129092 | 11/2007 |
| WO | WO 2009/034340 | 3/2009 |
| WO | WO 2009/034357 | 3/2009 |
| WO | WO 2009/034364 | 3/2009 |

OTHER PUBLICATIONS

Patent Application entitled, "Improvements Relating to Hose End Fittings", by Joel Aron Witz filed on Jun. 15, 2010 as U.S. Appl. No. 12/667,853.

International Search Report and Written Opinion for PCT Application Serial No. PCT/GB2008/003098, dated Dec. 12, 2008, 6 pages.

(56) References Cited

OTHER PUBLICATIONS

International Preliminary Report on Patentability for PCT Application Serial No. PCT/GB2008/003098, dated Mar. 16, 2010, 5 pages.
International Search Report and Written Opinion for PCT Application Serial No. PCT/GB2008/003135, dated Dec. 12, 2008, 7 pages.
International Preliminary Report on Patentability for PCT Application Serial No. PCT/GB2008/003135, dated Mar. 16, 2010, 6 pages.
International Search Report and Written Opinion for PCT Application Serial No. PCT/GB2008/003121, dated Dec. 15, 2008, 10 pages.
International Prelimiary Report on Patentability for PCT Application Serial No. PCT/GB2008/003121, dated Mar. 16, 2010, 7 pages.
International Preliminary Examination Report for PCT Application Serial No. PCT/GB01/02562, published on Dec. 20, 2001.
International Preliminary Report on Patentability for PCT Application Serial No. PCT/GB07/002446, dated Jan. 15, 2009.
International Preliminary Report on Patentability and Written Opinion for PCT Application Serial No. PCT/GB2007/003063, dated Feb. 26, 2009.
International Preliminary Report on Patentability and Written Opinion for PCT Application Serial No. PCT/GB2007/003058, dated Feb. 26, 2009.
Translation of Office Action for Chinese Patent Application Serial No. 2007800216292, dated Mar. 10, 2010, 9 pages.
Translation of Office Action for Chinese Patent Application Serial No. 2007800378028, dated Mar. 8, 2010, 8 pages.
Translation of Office Action for Chinese Patent Application Serial No. 2007800378136, dated Mar. 10, 2010, 6 pages.
Translation of Decision of Rejection for Chinese Patent Application Serial No. 2007800378136 dated Nov. 12, 2010, 8 pages.

* cited by examiner

HOSE

CROSS-REFERENCE TO RELATED APPLICATIONS

This application is a filing under 35 U.S.C. 371 of International Application No. PCT/GB2008/003135 filed Sep. 15, 2008, entitled "Hose," claiming priority of Great Britain Patent Application Nos. 0718018.5, 0718019.3, and 0718020.1, all filed Sep. 14, 2007, which applications are incorporated by reference herein in their entirety.

FIELD OF THE INVENTION

This invention relates to hose, and more particularly relates to hose which can be used in cryogenic conditions. Typical applications for hose involve the pumping of fluids from a fluid reservoir under pressure. Examples include supplying of domestic heating oil or LPG to a boiler; transporting produced oilfield liquids and/or gases from a fixed or floating production platform to the cargo hold of a ship, or from a ship cargo hold to a land-based storage unit; delivering of fuel to racing cars, especially during refueling in formula 1; and conveying corrosive fluids, such as sulphuric acid.

BACKGROUND OF THE INVENTION

It is well known to use hose for the transport of fluids, such as liquefied gases, at low temperature. Such hose is commonly used to transport liquefied gases such as liquefied natural gas (LNG) and liquefied petroleum gas (LPG).

In order for the hose to be sufficiently flexible, any given length must be at least partially constructed of flexible materials, i.e., non-rigid materials.

The present invention is directed to composite hose. Conventional composite hoses are made of layers of polymeric films and fabrics sandwiched between an inner and outer helical metallic wire. The hose is constructed by wrapping around a mandrel, in sequence, the inner wire, combinations of films and fabric, and the outer wire. The inner and outer wires have the same helical pitch but are offset by half the pitch length to form a corrugated hose wall profile. The resulting tubular structure is then extracted from the mandrel and terminated with end fittings. The end fittings are typically constructed of a metallic tail and a ferrule. The tail has two parallel helical groves machined into the outer surface which matches the double helix formed by the inner and outer wires. The tail is inserted into the bore of the hose with a ferrule on the outside. Depending on the application, the end of the hose pack may be bound, capped with a rubber cuff or impregnated with a two part epoxy resin, and the ferrule is then crimped or swaged down on to the tail to retain the end of the hose. A hose of this general type is described in European patent publication no. 0076540A1. The hose described in this specification includes an intermediate layer of biaxially oriented polypropylene, which is said to improve the ability of the hose to resist the fatigue caused by repeated flexing.

In our earlier patent application WO01/96772, we described a new composite hose which incorporated a braid with the film and fabric layers sandwiched between the two helical wires. We also described a new end fitting for this hose. Further improvements to the hose and end fitting were described in our patent applications WO04/044472 and WO04/079248. These composite hoses may be provided with a large bore and are typically aimed at ship to ship fluid transfer operations which are governed by the requirements of the International Maritime Organisation (IMO). The IMO requirements for hoses (International Code for the Construction and Equipment of Ships Carrying Liquefied Gases in Bulk—the "IGC Code") are demanding (for reasons of safety) that the hose burst pressure must be five times the maximum working pressure at the extreme service temperature. The maximum working pressure typically ranges from the minimum required by IMO of 10 barg up to 20 to 30 barg.

The inner and outer wires in composite hoses are conventionally made from steel. When the hose is to be used for cryogenic service, austenitic steels will be used.

Exemplary austenitic stainless steel grades for cryogenic service are the "series 300" which do not exhibit low temperature brittleness. The important material properties are the yield stress (YS), the yield strain (EY), the ultimate tensile strength (UTS), the failure strain (EF), the elastic modulus (E), the density (RHO), the thermal conductivity (K) and the thermal expansion coefficient (CTE). These properties vary over the range from ambient (293° K) to cryogenic temperatures (4° K for Liquid Helium or 77° K for Liquid Nitrogen [$LN_2$]). In general, the strength increases with reducing temperature. This is illustrated by considering as an example AISI grade 304 (8 g/cc density) which is a commonly used austenitic stainless steel for cryogenic service. The YS & UTS of 304 at room temperature is about 250 MPa & 590 MPa respectively, and at $LN_2$ temperature (77° K) about 400 MPa & 1525 MPa respectively. While there is some reduction in the ductility with EF reducing from 60% at ambient temperature to 40% at $LN_2$ temperature, there is more than adequate ductility with 304 at this cryogenic temperature. Although this increase in strength is considered beneficial, designers of cryogenic pressure vessels tend to rely on the minimum ambient temperature specifications. The ambient $LN_2$ temperature elastic moduli for 304 are 193 GPa and 205 GPa respectively.

An important design issue for cryogenic equipment is the effects of the dimensional changes and thermal gradient transients associated with the circa 215° K temperature change from room ambient to cryogenic service conditions. Steels such as 304 are thermally conductive and they will contract with decreasing temperature. The thermal conductivities for 304 at room temperature and $LN_2$ temperature are 8 & 15 W/m.° K respectively. The average CTE over this temperature range is $13 \times 10^{-6}$ ° $K^{-1}$ i.e. a length contraction of about 3 mm/m for this temperature difference of 216° K.

In order to maintain the hose wall arrangement it is important to maintain the tension in the outer wire. Because the wall pack of the hose is made up of a thick layer of films and fabrics it has inherently good insulation properties and therefore there is a temperature difference between the inner and outer helical wire when in cryogenic service. Therefore the inner wire will contract more than the outer wire and this is compensated for by the residual tensions in the respective wires introduced during manufacture.

SUMMARY OF THE INVENTION

We have found that we can improve the properties of a cryogenic hose by making at least some of the components of the hose from a material that expands in at least one direction on cooling. We have also found we can improve the properties of the hose by making at least some of the components of the hose from a composite material. It should be noted that this reference to "composite material" differs from the use of the word "composite" in "composite hoses".

BRIEF DESCRIPTION OF THE DRAWINGS

Reference is now made to the accompanying drawings, in which.

DETAILED DESCRIPTION OF THE INVENTION

According to a first aspect of the invention there is provided a hose comprising a tubular body of flexible material arranged between inner and outer gripping members, wherein at least one of the gripping members is made of a material which expands in at least one direction on cooling thereof.

In one embodiment, both the inner and outer gripping members are made of a material which expands on cooling. In another embodiment, only the outer gripping member is made of a material which expands on cooling.

However, in the preferred embodiment, only the inner gripping member is made of material which expands on cooling; in this preferred embodiment, the outer member may be made of a conventional hose gripping member material, which contracts on cooling. This ensures that when the when the hose is subjected to cooling, the outer member contracts, while the inner member expands, causing the tubular body to be compressed between the inner and outer members.

The material which expands on cooling is preferably such that the gripping member, which is made of an elongate material, expands along the length of the elongate material when cooled; this means that when the gripping member is provided as a helical coil, the diameter of the coil will increase when the ends of the coil are held fixed.

This longitudinal expansion has the effect of causing an increase in the radius of the coils of the gripping members. If both the inner and outer gripping member expand, the net effect on hose radius will be difference between expansions. If one contracts, and one expands there may be zero net effect in the axial or radial direction of the hose, if they are selected to counterbalance one another, as is preferred. Note that in cryogenic applications there will be a temperature gradient across the hose, so if the same materials are used in the inner and outer gripping members, the inner member will expand more than outer one because it's colder. The inner and outer gripping members are preferably formed as coils: the inner gripping member forms an inner coil, and the outer gripping member forms an outer coil, the tubular body being arranged between the inner and outer coils. The coils are preferably helical. The pitches of the inner and outer coils are preferably the same. The inner and outer coils are preferably arranged such that they are offset from one another by half the pitch length. The gripping members are preferably formed as a wire, rod or tube. The gripping members may have any suitable cross section, such as circular, elliptical, square, rectangular, triangular, and so on. It is preferred that the cross section is circular or elliptical.

The longitudinal expansion on cooling takes place along the length of the gripping member, with results in the gripping member tending to increase in length. When the gripping member is in the form of a coil, this results in an increase in the diameter of the coil when the ends of the gripping member are fixed.

The material which expands on cooling is preferably a composite material. "Composite materials" are materials that are made from a combination of two or more materials to give a unique and tailor made set of properties. The most common form of composite material is a matrix of fibres within a resin. The fibres may be continuous with an orientation in the longitudinal direction or the fibres may be short lengths in mixed orientation. The fibres are usually high strength fibres such as E-Glass, S-Glass, Aramid (e.g. Kevlar (trademark)) or Carbon. The resin encapsulates the fibres and it may be a thermoplastic resin such as a polyethylene, a polyimide, a polyamide, a fluoropolymer, poly(vinylchloride) (PVC), polyurethane (PU), Polyetheretherketone (PEEK) or a thermosetting resin such as an epoxy or a polyester or a vinyl ester or a cross linked flexible resin such as PU or silicone rubber. The composite material may be a laminated construction with layers of longitudinal fibres in a resin matrix orientated in differing directions in order to achieve the desired mechanical properties. The use of high strength fibres within the composite material generally results in a construction with a considerable strength to weight ratio and for this reason composite materials have found widespread application in the aerospace and automotive industries including pressure vessel applications.

Many of the constituent components of a composite material such as epoxy resin would not be suitable for cryogenic service in a bulk homogeneous form, mainly because of their brittleness at low temperatures. However when the constituent materials are carefully combined in fibre and laminate form with other constituent materials in a matrix then the structural interaction is such that the constraints of the bulk homogeneous constituent material may be overcome.

We have found that in order to improve the cryogenic properties of the hose according to the invention, we can construct the gripping members, especially the inner gripping member from a composite material.

We have found that fibre selection is important and we prefer to use carbon, aramid or glass, or combinations thereof. These fibres may be combined with other fibres provided the combination has a net effect of expanding in at least one direction on cooling. For example, representative tensile strengths, tensile moduli and densities for E-Glass, Kevlar-49, MS-LM (Medium Strength Low Modulus) Carbon fibres are in order: 3450, 3790, 4138 MPa for the tensile strength; 72, 124, 228 GPa for the tensile modulus; and 2.6, 1.4, 1.8 g/cc for the density.

We have found that both thermosetting and thermoplastic resins may be used, including epoxy resin and PEEK resin. The density of epoxy and PEEK are both about 1.3 g/cc. We have found that by using a composite material containing some of the high strength fibres identified above, in the gripping member, there is a reduction in the weight of the hose.

We have further found it is advantageous to use a composite material for the gripping member, as it has a lower thermal conductivity compared to steel. Typically the thermal conductivity is about 0.1 to 1 W/m.° K which is at least an order of magnitude less than austenitic stainless steel. This is useful in cryogenic applications.

We have found that it is particularly advantageous to use the rather unusual properties of carbon and certain aramid fibres, which exhibit a negative longitudinal CTE and a positive transverse CTE. The aramid fibres are preferably a poly-(p-phenyleneterephthalamide), known as Kevlar® or Twaron®. For example the longitudinal CTE for Kevlar-49 is $-2 \times 10^{-6}$ $K^{-1}$ and in the transverse direction is $68 \times 10^{-6}$ $K^{-1}$. In a laminated composite construction containing these fibres the ply expands in the fibre direction and contracts transversely with reducing temperature. We note that internal shear forces develop within a balanced symmetrical arrangement of plies and the result is a net longitudinal expansion on cooling. By adjusting the fibre direction it is possible to control the magnitude the expansion to the point where an effective longitudinal CTE from zero to about $-10 \times 10^{-6}$ K$^{-1}$ can be achieved. The preferred longitudinal CTE range is from below zero (e.g. below or equal to about $-0.01°$ K$^{-1}$ or about $-0.1°$ K$^{-1}$) to $-4 \times 10^{-6}$ K$^{-1}$, most preferably Axle to $-2 \times 10^{-6}$ K$^{-1}$.

In the preferred embodiment, the material that expands on cooling is a composite material made from carbon or aramid fibres, especially poly-(p-phenyleneterephthalamide) such as Kevlar (trademark) and Twaron (trademark), that expand with reduction in temperature. The fibres are preferably arranged substantially unidirectionally. When used for in the inner gripping member of the hose, this material maintains the contact pressures with the adjacent fabric and therefore enhances the integrity of the hose wall pack.

In a particularly advantageous embodiment, the inner gripping member is made of a material which expands on cooling, preferably a composite material; and the outer gripping member is made of a non-metallic material which has properties capable of withstanding the loads and temperatures to which the hose will be subjected, such as non-composite polymers, especially ultra high molecular weight polyethylene, and composite materials. When the outer gripping member is made of a composite material, we prefer that it is not a material which expands on cooling.

In a particularly advantageous embodiment, the inner gripping member is made of a material which expands longitudinally on cooling, preferably a composite material; and the outer gripping member is made of a material which contracts on cooling, or does not substantially change length on cooling, preferably a composite material or a non-composite polymeric material.

The use of a composite material in the inner and/or outer gripping member has the further advantage of reducing the weight per unit length of the hose, which aids handling. For example with an aerial 16" (400 mm) bore composite hose each gripping member is typically made of helical stainless steel wire and contributes about one third of the total weight per unit length of the hose. Replacing only the inner gripping member with a composite material reduces the weight per unit length by about a quarter, and replacing both the inner and outer gripping members with a composite material reduces the weight per unit length by about half.

According to a second aspect of the invention there is provided a hose comprising a tubular body of flexible material arranged between inner and outer helical gripping members, wherein the inner gripping member is made of a composite material, and the outer gripping member is made of a composite material or a non-composite polymeric material.

In this aspect of the invention, the inner and outer gripping members are preferably formed as coils: the inner gripping member forms an inner coil, and the outer gripping member forms an outer coil, the tubular body being arranged between the inner and outer coils. The coils are preferably helical. The pitches of the inner and outer coils are preferably the same. The inner and outer coils are preferably arranged such that they are offset from one another by half the pitch length. The gripping members are preferably formed as a wire, rod or tube. The gripping members may have any suitable cross section, such as circular, elliptical, square, rectangular, triangular, and so on. It is preferred that the cross section is circular or elliptical.

The inner gripping member is preferably made of a composite material that expands longitudinally on cooling. Preferably the inner member is made of a composite material that includes carbon fibres or aramid fibres, especially poly-(p-phenyleneterephthalamide) fibres. Most preferably the fibres are arranged substantially unidirectionally.

The outer gripping member may be made of a composite material that expands on cooling, but preferably it is made of a material which contracts on cooling, or does not change length on cooling, as this provides the optimum compression of the tubular body during operation at cryogenic temperatures.

The hose according to the above aspects of the invention described above may also be provided with one or more of the features of the hose already described in WO01/96772. These will be described in greater detail below.

The hose preferably further comprises an axial strengthening means adapted to reduce deformation of the tubular body when the tubular body is subjected to axial tension, and the axial strengthening means is further adapted to exert a radially inward force on at least part of the tubular body when axial strengthening means is subjected to axial tensioning. The failure strain of the tubular body and the axial strengthening means is preferably within the range of 1 to 10%. More preferably the failure strain is in excess of 5% at ambient and cryogenic temperatures. In addition, the materials of the tubular body and the axial strengthening means are advantageously compatible so that they each perform in a similar manner when in operation, so that no single component is subjected to excessive stresses and strains. This means that the materials of the tubular body and the axial strengthening means respond to strain in a similar manner. A bend strain (for a cylindrical component) of at least 3% is generally needed for the type of hose applications primarily envisaged by the present invention. While, inter-layer slip and the straightening of helically oriented components will account for some of this slip, there will still be a resultant strain in the order of 1% acting on the structural components of the hose wall. This compares to a typical yield strain of 0.2% for metals.

It is preferred that the axial strengthening means is made of a non-metallic material, especially a plastics material—suitable materials are discussed in detail below. This is because metallic materials are unlikely to have the desired strain characteristics.

It is preferred that the tubular body and the axial strengthening means comprise the same material, most preferably ultra high molecular weight polyethylene (UHMWPE), as described in further detail below.

The tubular body preferably comprises at least one reinforcing layer and at least one sealing layer. More preferably, there are at least two reinforcing layers with the sealing layer sandwiched therebetween. In the preferred embodiment, the reinforcing layers and the sealing layers are wrapped around the inner gripping member.

Preferably, a further reinforcing layer is provided between the outer gripping member and the axial strengthening means.

The ultimate strength of the reinforcing layer(s) is preferably between 100 and 700 kN for an 8" (200 mm) diameter hose. It is preferable that the bend strain at failure of the reinforcing layer(s) is in the range 2% to 15%. Desirably, further reinforcing layer(s) are the same material as the axial strengthening means, most preferably UHMWPE.

Preferably the axial strengthening means comprises a generally tubular sheath formed of a sheet of material provided in a tubular shape, such that the sheath can maintain the integrity of its tubular shape when subjected to axial tension. The hose may be provided with two or more tubular sheaths in order to further improve the performance of the hose under axial tension.

It is preferred that the axial strengthening means is provided in the form of a generally tubular braid. In this specification the term "braid" refers to a material which is formed of two or more fibres or yarns which have been intertwined to form an elongated structure. It is a feature of braid that it can elongate when subjected to an axial tension. It is a further feature of braid that, when provided in a tubular form, its diameter will reduce when the braid is subjected to axial tension. Thus by providing a tubular braid around the tubular body, or within the structure of the tubular body, the braid will exert a radially inward force on at least part of the tubular body when subjected to axial tension.

It is preferred that the entire tubular sheath is provided in the form of the braid. However, it is possible for only one or more parts of the length of the tubular sheath to be provided in the form of the braid.

It is also preferred that the braid extends all the way around the circumference of the tubular sheath. However, it is possible for only part of the circumference of the tubular sheath to be provided in the form of the braid.

The braid may be provided in a biaxial form (i.e. in which the braid is formed of only two intertwining fibres or yarns) or in a triaxial form (i.e. in which there are also longitudinally extending fibres or yarns, for increased axial strength).

Although it is preferred to provide the axial strengthening means in the form of a braid, it may be provided in other forms which meet the functional requirements specified above. Thus, the axial strengthening means may be provided as a suitable arrangement of cords or ropes helically wrapped around the tubular body.

The materials of construction of the hose should be selected to enable the hose to perform in the environment for which it is intended. Thus, there is a need for the hose to be able to transport pressurised fluids therethrough without leakage of the fluid through the walls of the hose. There is also a need for the hose to withstand repeated flexing, and to withstand the axial stresses caused by the combination of the hose and fluid weight. Also, if the hose is intended for use in transporting cryogenic fluids, the materials should be capable of operating at extremely cold temperatures without any significant reduction in performance.

The main purpose of the or each reinforcing layer is to withstand the hoop stresses which the hose is subjected to during transport of fluids therethrough. Thus, any reinforcing layer which has the required degree of flexibility, and which can withstand the necessary stresses, will be adequate. Also, if the hose is intended for transporting cryogenic fluids, then the or each reinforcing layer must be able to withstand cryogenic temperatures.

We prefer that the or each reinforcing layer is formed of a sheet of material which has been wound into a tubular form by winding the sheet material in a helical manner. This means that the or each reinforcing layer does not have much resistance to axial tension, as the application of an axial force will tend to pull the windings apart. The or each reinforcing layer may comprise a single continuous layer of the sheet material, or may comprise two or more single continuous layers of the sheet material. However, more usually (and depending on the length of the hose) the or each layer of the sheet material would be formed of a plurality of separate lengths of sheet material arranged along the length of the hose.

In the preferred embodiment each reinforcing layer comprises a fabric, most preferably a woven fabric. The or each reinforcing layer may be a natural or synthetic material. The or each reinforcing layer is conveniently formed of a synthetic polymer, such as a polyester, a polyamide or a polyolefin. The synthetic polymer may be provided in the form of fibres, or a yarn, from which the fabric is created.

When the or each reinforcing layer comprises a polyester, then it is preferably polyethylene terephthalate.

When the or each reinforcing layer comprises a polyamide, then it may be an aliphatic polyamide, such as a nylon, or it may be an aromatic polyamide, such as an aramid compound. For example, the or each reinforcing layer may be a poly-(p-phenyleneterephthalamide) such as KEVLAR (registered trade mark).

When the or each reinforcing layer comprises a polyolefin, then it may be a polyethylene, polypropylene or polybutylene homopolymer, or a copolymer or terpolymer thereof, and is preferably monoaxially or biaxially oriented. More preferably, the polyolefin is a polyethylene, and most preferably the polyethylene is a high molecular weight polyethylene, especially UHMWPE.

The UHMWPE used in the present invention would generally have a weight average molecular weight above 400,000, typically above 800,000, and usually above 1,000,000. The weight average molecular weight would not usually exceed about 15,000,000. The UHMWPE is preferably characterised by a molecular weight from about 1,000,000 to 6,000,000. The UHMWPE most useful in the present invention is highly oriented and would usually have been stretched at least 2-5 times in one direction and at least 10-15 times in the other direction.

The UHMWPE most useful in the present invention will generally have a parallel orientation greater than 80%, more usually greater than 90%, and preferably greater than 95%. The crystallinity will generally be greater than 50%, more usually greater than 70%. A crystallinity up to 85-90% is possible.

UHMWPE is described in, for example, U.S. Pat. No. 4,344,908, U.S. Pat. No. 4,411,845, U.S. Pat. No. 4,422,993, U.S. Pat. No. 4,430,383, U.S. Pat. No. 4,436,689, EP-A-183285, EP-A-0438831, and EP-A-0215507.

It is particularly advantageous that the or each reinforcing layer comprises a highly oriented UHMWPE, such as that available from DSM High Performance Fibres BV (a Netherlands company) under the trade name DYNEEMA, or that available from the US corporation AlliedSignal Inc. under the trade name SPECTRA.

Additional details about DYNEEMA are disclosed in a trade brochure entitled "DYNEEMA; the top performance in fibers; properties and application" issued by DSM High Performance Fibers BV, edition 02/98. Additional details about SPECTRA are disclosed in a trade brochure entitled "Spectra Performance Materials" issued by AlliedSignal Inc., edition 5/96. These materials have been available since the 1980s.

In the preferred embodiment, the or each reinforcing layer comprises a woven fabric formed of fibres arranged in a weft and warp direction. We have found that it is particularly advantageous if the or each reinforcing layer is arranged such that the fabric warp direction is at an angle of less than or equal to 20° to the axial direction of the hose; we also prefer that this angle is greater than or equal to 5°. In the preferred embodiment, the or each reinforcing layer is arranged such that the fabric warp direction is at an angle of from 5° to 15°, most preferably about 10°, to the axial direction of the hose. The tolerance in these figures is about 1-2°.

The axial strengthening means may also be formed of the same material as the or each reinforcing layer. Thus, it will be clear that the axial strengthening means, the or each reinforcing layer and the sealing layer may all be formed from the same basic compound. However, the form of the compound must be different in order to provide the required function, i.e., the axial strengthening means provides an axial reinforcement function, the or each reinforcing layer provides reinforcement against hoop stresses, and the sealing layer provides a sealing function. We have found that the UHMWPE materials are most suitable, particularly the DYNEEMA and SPECTRA products. These material have also been found to work well in cryogenic conditions. The preferred parameters of the UHMWPE (molecular weight range, etc) discussed above in relation to the reinforcing layers, are also appropriate to the axial strengthening means. In this regard is should be noted, however, that the parameters of the UHMWPE used in the axial strengthening means need not be the same as the parameters of the UHMWPE used in the reinforcing layers.

It would be possible for the axial strengthening means to be provided within the layers of the tubular body. However we prefer than the axial strengthening means is positioned between the tubular body and the outer gripping member. In an another preferred embodiment, the axial strengthening means is provided within the layers of the tubular body, and a further axial strengthening means is also provided between the tubular body and the outer gripping member.

The purpose of the sealing layer is primarily to prevent the leakage of transported fluids through the tubular body. Thus, any sealing layer which has the required degree of flexibility, and which can provide the desired sealing function, will be adequate. Also, if the hose is intended for transporting cryogenic fluids, then the sealing layer must be able to withstand cryogenic temperatures.

The sealing layer may be made from the same basic materials as the or each reinforcing layer. As an alternative, the sealing layer may be a fluoropolymer, such as: polytetrafluoroethylene (PTFE); a fluorinated ethylene propylene copolymer, such as a copolymer of hexafluoropropylene and tetrafluoroethylene (tetrafluoroethylene-perfluoropropylene) available from DuPont Fluoroproducts under the trade name Teflon FEP; or a fluorinated hydrocarbon-perfluoralkoxy—available from DuPont Fluoroproducts under the trade name Teflon PFA. Another suitable material is an ethylene chlorotrifluoroethylene film (ECTFE), particularly Halar ECTFE. These films may be made by extrusion or by blowing.

We prefer that the sealing layer is formed of a sheet of material which has been wound into a tubular form by winding the sheet material in a helical manner. As with the reinforcing layers, this means that the or each sealing layer does not have much resistance to axial tension, as the application of an axial force will tend to pull the windings apart. The sealing layer may comprise a single continuous layer of the sheet material, or may comprise two or more single continuous layers of the sheet material. However, more usually (and depending on the length of the hose) the or each layer of the sheet material would be formed of a plurality of separate lengths of sheet material arranged along the length of the hose. If desired the sealing layer may comprise one or more heat shrinkable sealing sleeves (i.e. tubular in form) which are arranged over the inner reinforcing layer.

We prefer that the sealing layer comprises a plurality of overlapping layers of film. Preferably there would be at least 2 layers, more preferably at least 5 layers, and still more preferably at least 10 layers. In practice, the sealing layer may comprise 20, 30, 40, 50, or more layers of film. The upper limit for the number of layers depends upon the overall size of the hose, but it is unlikely that more than 100 layers would be required. Usually, 50 layers, at most, will be sufficient. The thickness of each layer of film would typically be in the range 50 to 100 micrometers.

It will, of course, be appreciated that more than one sealing layer may be provided.

In an embodiment, the sealing layer comprises at least two polymeric films, one of the films being made of a first polymer and another of the films being made of a second polymer different from the first polymer.

In this embodiment, one of the polymeric films is stiffer than the other of the films, whereby a differential yield strain is present in the material properties at the operating temperature and pressure. Preferably the outer film is stiffer than the inner film. The effect of this is that in the unfortunate occurrence of a hose burst, there is a controlled failure of the sealing layer such that the stiffer outer polymer fails while the more ductile polymer holds the internal pressure for a finite time, allowing the pressure gradually to dissipate.

In this preferred embodiment, the maximum strain at failure is in excess of 100% at ambient temperature for the more ductile layer, and is at least 20% less for the other layer.

Each polymeric film of the sealing layer is preferably a polyamide, a polyolefin or a fluoropolymer.

When the polymeric film of the sealing layer comprises a polyamide, then it may be an aliphatic polyamide, such as a nylon, or it may be an aromatic polyamide, such as an aramid compound.

We prefer that one of the polymeric films of the sealing layer is a polyolefin and that another of the polymeric films of the sealing layer is a fluoropolymer.

Suitable polyolefins include a polyethylene, polypropylene or polybutylene homopolymer, or a copolymer or terpolymer thereof. Preferably the polyolefin film is monoaxially or biaxially oriented. More preferably, the polyolefin is a polyethylene, and most preferably the polyethylene is a high molecular weight polyethylene, especially UHMWPE, which is described in greater detail above. The preferred parameters of the UHMWPE (molecular weight range, etc) discussed above in relation to the reinforcing layers, are also appropriate to the sealing layer. In this regard is should be noted, however, that the parameters of the UHMWPE used in the sealing layer need not be the same as the parameters of the UHMWPE used in the reinforcing layers.

Since the sealing layer is intended to provide a sealing function, the sealing layer should be provided in the form of a film which is substantially impermeable to the transported fluids. Thus, the highly oriented UHMWPE needs to be provided in a form which has satisfactory sealing properties. These products are usually provided in the form of a solid block which can be further processed in order to obtain the material in the required form. The film may be produced by skiving a thin film off the surface of the solid block. Alternatively the films may be blown films of UHMWPE.

Suitable fluoropolymers include polytetrafluoroethylene (PFTE); a fluorinated ethylene propylene copolymer, such as a copolymer of hexafluoropropylene and tetrafluoroethylene (tetrafluoroethylene-perfluoropropylene) available from DuPont Fluoroproducts under the trade name Teflon FEP; or a fluorinated hydrocarbon—perfluoralkoxy—available from DuPont Fluoroproducts under the trade name Teflon PFA. Another suitable material is ECTFE, particularly Halar ECTFE. These films may be made by extrusion or by blowing.

Preferably, the sealing layer comprises a plurality of layers of each of the polymeric films. In an embodiment, the layers may be arranged so that the first and second polymers alternate through the thickness of the sealing layer. However, this is not the only possible arrangement. In another arrangement all the layers of the first polymer may be surrounded by all the layers of the second polymer, or vice versa.

It will, of course, be appreciated that more than one of the sealing layers may be provided.

Preferably, the sealing layer further comprises at least one layer partially or entirely comprising a metal, a metal oxide or a mixture thereof. In this specification references to metal containing films includes metal oxide containing films, unless stated otherwise. Thus, the metal layer may be a layer of metallic film (i.e. a separate layer consisting substantially entirely of a metal, a metal oxide or a mixture thereof), or a polymer coated metallic film or a metallised polymer film. We prefer that the metal layer is a polymer coated metallic film. The metal may be, for example, aluminium oxide. The polymer may be, for example, a polyester.

Suitable polymer coated metal films include the films available from HiFi Industrial Film, of Stevenage, England, under the trade names MEX505, MET800, MET800B and MET852; MET800B is preferred.

A further metal layer may be disposed outwardly of the sealing layer. Preferably, the further metal layer is disposed between the tubular body and the outer gripping member. Rockwool layers may also be provided here to improve the thermal insulation, preferably between the sealing layer and the outer metal layer—the aim of this is to create a thermal annulus between the two metal layers.

The metal containing film is reflective and therefore reduces heat loss or heat gain—this is especially useful for cryogenic applications. In addition the metal containing film provides good barrier properties, thereby reducing vapour transmission—this is useful to prevent material loss transporting gases.

Another the feature of the sealing layer is that it comprises an UHMWPE. If the UHMWPE sealing layer is formed of heat shrinkable sleeves, it is not essential for the sleeves to be made of different materials, but they should preferably be made of UHMWPE.

Preferably, the sealing layer comprises at least two polymeric films of different materials, and at least one of the films comprises an ultra high molecular weight polyethylene.

Another preferable embodiment of the invention relates to a cured resin matrix disposed around the tubular body, the outer gripping member being at least partially embedded in the resin matrix in order to restrict relative movement between the outer gripping member and the rest of the hose.

The cured resin matrix must have sufficient flexibility to allow the hose to bend to the extent that is required for the specific applications of the hose. Clearly, some applications may require more flexibility than others.

The resin matrix preferably comprises a synthetic polymer, such as polyurethane. It is especially preferred that the resin matrix is made of a material that, prior to curing, is capable of being applied in liquid form to the hose. Typically, the uncured resin may be applied to the hose by spraying, pouring or painting. This enables the uncured resin to be applied over the outer surface of the tubular body and the outer gripping members, and then cured in-situ to form a solid, flexible coating. The mechanism of curing may be light, moisture, etc.

The resin matrix may bond to a layer under the outer gripping member and also to any layer provided on the outer surface of the resin matrix. It is preferred that at least one of the layers adjacent the cured resin matrix is capable of withstanding cryogenic temperatures, so that, if the resin matrix cracks owing to the cryogenic temperatures, the adjacent layer holds the resin matrix together by virtue of the adhesion between the resin matrix and the adjacent layer. The most stable structure is achieved when both sides of the resin matrix are bonded to adjacent layers.

We have also found that certain materials can provide hose with especially good insulation, particularly at cryogenic temperatures. In particular, we have found that fabrics formed of basalt fibres provide particularly good insulation.

Suitable basalt fibre fabrics are available from the Sudaglass Fiber Company under the trade designations BT-5, BT-8, BT-10, BT-11 and BT-13. The preferred thickness of the fabric is from about 0.1 mm up to about 0.3 mm. If desired, a plurality of layers of the basalt fabric may be employed.

We have also found that the insulation properties of basalt fabrics improve under compression, therefore we prefer to provide a compression layer around the basalt fabric, which serves to compress the basalt layer.

The insulation layer may further include layers made of other insulation material, such as polymeric foams, in addition to the layer(s) of basalt fabric.

We prefer that the insulation layer further includes at least one reinforcement layer. The reinforcement layer may comprise a synthetic polymer, such as a polyester, a polyamide or a polyolefin. The reinforcement layer may be made of the same materials as the inner and outer reinforcing layers of the tubular body, which are described above. It is particularly preferred that the reinforcement layer of the insulation layer is an ultra high molecular weight polyethylene (UHMWPE), such as DYNEEMA or SPECTRA, as described above.

Another preferred embodiment of the invention involves a layer comprising a plastics material having gas bubbles therein.

The plastics material is preferably a polyurethane. It is preferred that the plastics material is applied to the tubular body by spraying the plastics material, in liquid form, over the surface of the tubular body, then leaving it to cure. Again, the curing may take place simply by leaving the coated hose to stand in air, or may be effected, or accelerated, by an active means such as heating.

The gas bubbles may be incorporated by injecting the gas into the plastics material, before spraying, while it is still in a liquid form.

The resultant layer of gas-containing plastics material has some of the beneficial structural properties of the plastics material itself, such as good wear and crush resistance, but also has substantially improved insulation properties. It also has improved buoyancy caused by the presence of the gas, and can be used to produce a hose capable of floating in water and with evenly distributed buoyancy along its length.

Preferably the gas-containing plastics material is covered by a further layer of plastics material, which does not contain any substantial amount of gas bubbles. Preferably this further layer of plastics material is bonded securely to the gas-containing layer. The further layer of plastics material may be the same plastics material as the gas-containing layer. Preferably the further layer of plastics material comprises a polyurethane.

Both layers of plastics material can be applied by techniques other than spraying, such as pouring, painting or extrusion.

Any suitable gas may be used to form the bubbles, including air, nitrogen or an inert gas.

The specific gravity of the polyurethane, prior to aeration, is preferably approximately 1.2.

The hose typically has a specific gravity of around 1.8 without the gas-containing layer. Preferably the hose has an overall specific gravity of less than 1, preferably less than 0.8, after application of the gas-containing layer. The PU coating thickness may be, for example, about 4-8 mm, preferably about 6 mm. The gas bubbles are preferably less than about 2 mm in diameter.

In particular the invention may include a layer comprising a cured resin matrix, as described above, in addition to a gas containing layer. In this construction, the gas containing layer would typically be disposed outwardly of the cured resin matrix. It is possible for the gas containing layer to replace the cured resin matrix, such that the gas containing layer has the gripping members embedded therein to restrict relative movement of the outer gripping members.

The hose may be provided with an end fitting at each end thereof. The end fitting may be of the type disclosed in our earlier patent applications WO01/96772 and WO04/079248, the contents of which are incorporated by reference.

The hose according to the invention can be provided for use in a wide variety of conditions, such as temperatures above 100° C., temperatures from 0° C. to 100° C. and temperatures below 0° C. With a suitable choice of material, the hose can be used at temperatures below −20° C., below −50° C. or even below −100° C. For example, for LNG transport, the hose may have to operate at temperatures down to −170° C., or even lower. Furthermore, it is also contemplated that the hose may be used to transport liquid oxygen (bp −183° C.) or liquid nitrogen (bp −196° C.), in which case the hose may need to operate at temperatures of −200° C. or lower.

The hose according to the invention can also be provided for use at a variety of different duties. Typically, the inner diameter of the hose would range from about 2 inches (51 mm) to about 24 inches (610 mm), more typically from about 8 inches (203 mm) to about 16 inches (406 mm). The hose diameter is usually at least 4 inches (102 mm), more usually at least 6 inches (152 mm).

In general, the operating pressure of the hose would be in the range from about 500 kPa gauge up to about 4000 kPa gauge. These pressures relate to the operating pressure of the hose, not the burst pressure (which must be several times greater). The volumetric flow rate depends upon the fluid medium, the pressure and the inner diameter. Flowrates from 1000 m$^3$/h up to 12000 m$^3$/h are typical.

The hose according to the invention can also be provided for use with corrosive materials, such as strong acids.

Figure 1:
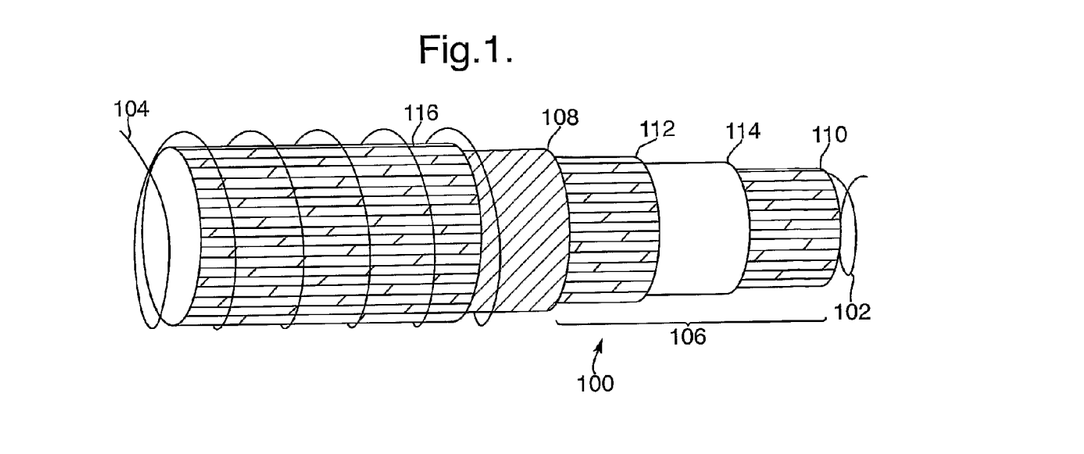
FIG. 1 is a perspective view of a hose according to the invention.
Figure 2:
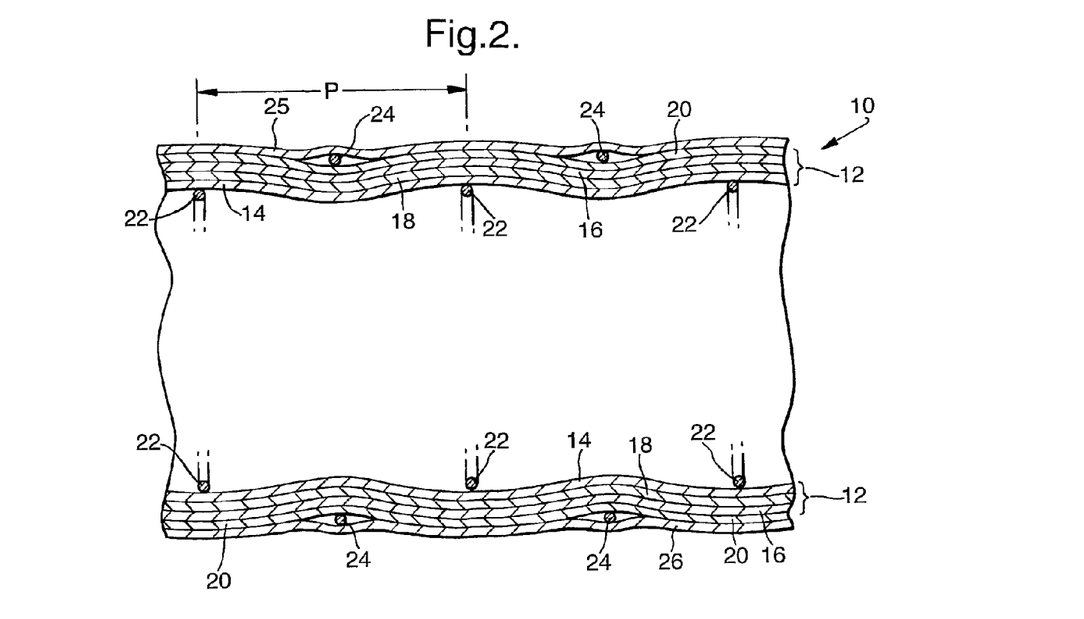
FIG. 2 is a schematic cross sectional view the hose shown in FIG. 1.

Briefly, the hose 100 comprises elongate inner and outer gripping members 102 and 104, which are preferably arranged in a coiled helical form, and are preferably wires. A tubular body 106 and an axial reinforcing braid 108 are arranged between the gripping members 102 and 104; the braid 108 surrounds the tubular body 106. The tubular body comprises an inner reinforcing layer 110, and outer reinforcing layer 112 and a sealing layer 114 arranged between the inner and outer reinforcing layers 110, 112. An outer protective/insulative layer 116 surrounds the braid 108. The ends of the hose are sealed with an end fitting 200.

The inner gripping member 102 is preferably made of a composite material which expands longitudinally on cooling, while the outer gripping member 104 is preferably made of a composite or a non-composite polymeric material which contracts on cooling.

It will be appreciated that the invention described above may be modified within the scope of the claims.

The invention claimed is:

1. A hose comprising a tubular body of flexible material arranged between an inner elongate gripping member, formed of a material which, on cooling, expands in the longitudinal direction of the gripping member and an outer gripping member made of a material which contracts on cooling, or does not substantially change length on cooling, wherein the inner elongate gripping member is formed of a composite material that comprises a matrix of fibers within a thermoplastic or thermosetting resin.

2. The hose according to claim 1, wherein the inner and outer gripping members are formed as coils.

3. The hose according to claim 1, wherein the inner and outer gripping members are helical.

4. The hose according to claim 1, wherein the tubular body comprises a reinforcing layer and a sealing layer.

5. The hose according to claim 1, wherein the tubular body comprises a sealing layer arranged between inner and outer reinforcing layers.

6. The hose according to claim 4, wherein the or each reinforcing layer is wrapped around the inner gripping member.

7. The hose according to claim 4, wherein there is a plurality of sealing layers wrapped around the inner gripping member.

8. The hose according to claim 1, further comprising an axial strengthening means.

9. The hose according to claim 8, wherein the axial strengthening means comprises a tubular braid extending along at least part of the length of the hose.

10. The hose according to claim 1, further comprising an end fitting secured to each end of the hose.

11. The hose according to claim 1, wherein the longitudinal CTE range for each gripping member which expands on cooling is from below zero to $-4\times10^{-6}$ K$^-$.

* * * * *